Sept. 27, 1966 J. R. BEATTIE 3,275,430
RADIANT TYPE COOLER IN APPARATUS FOR
PRODUCING GLASS IN RIBBON FORM
Filed March 29, 1963 3 Sheets-Sheet 1
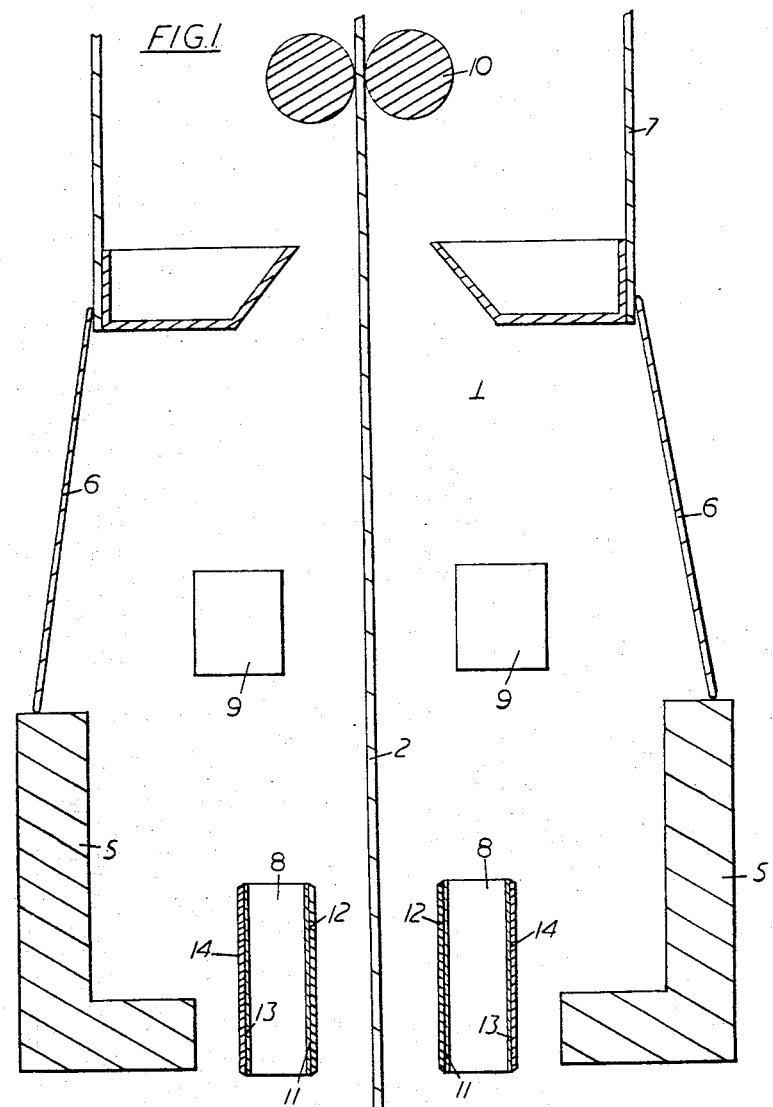
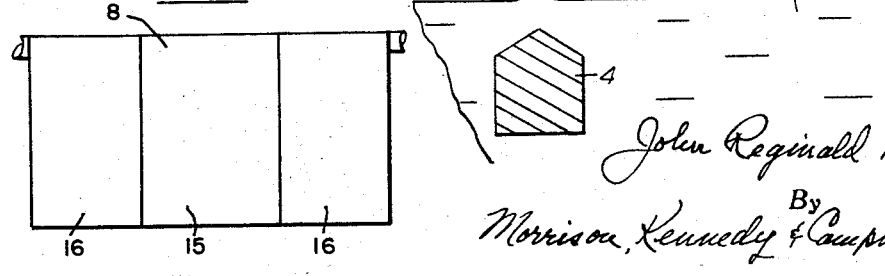
John Reginald Beattie Inventor
By Morrison, Kennedy & Campbell Attorneys

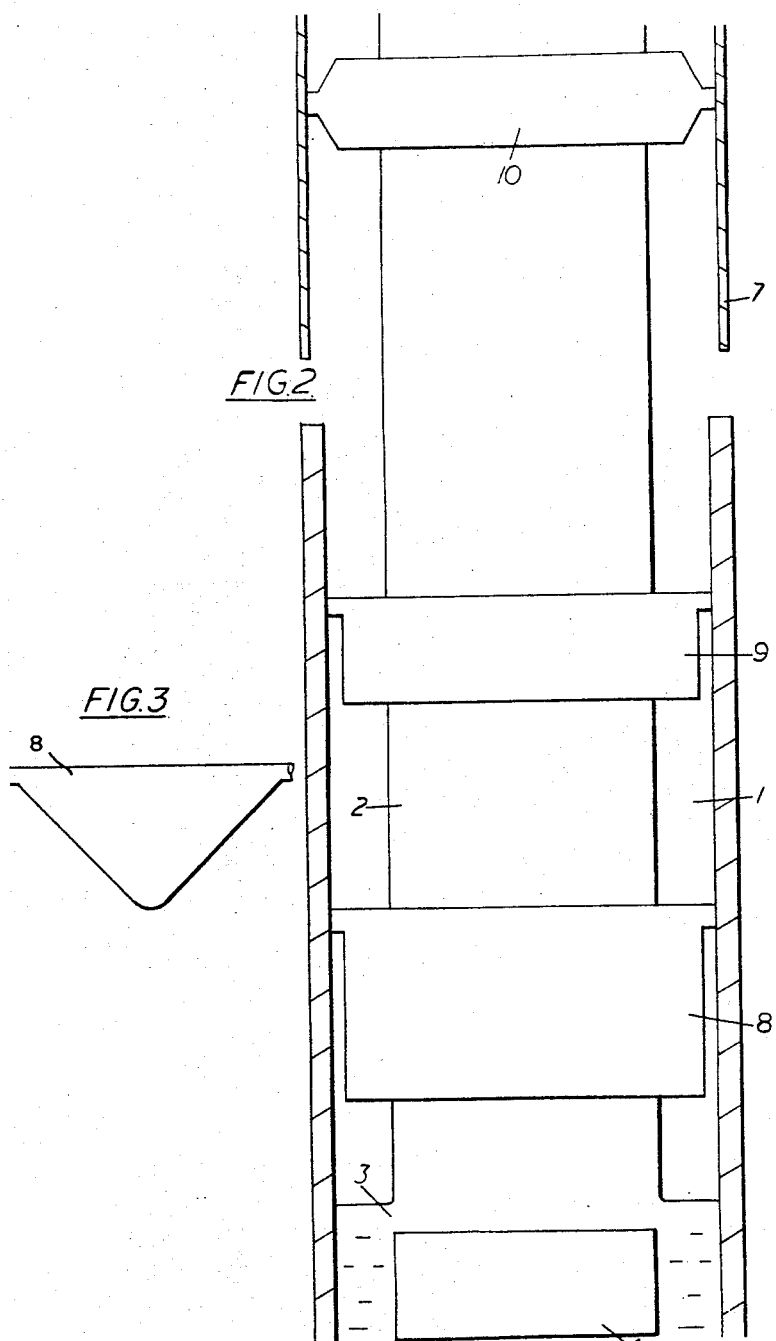

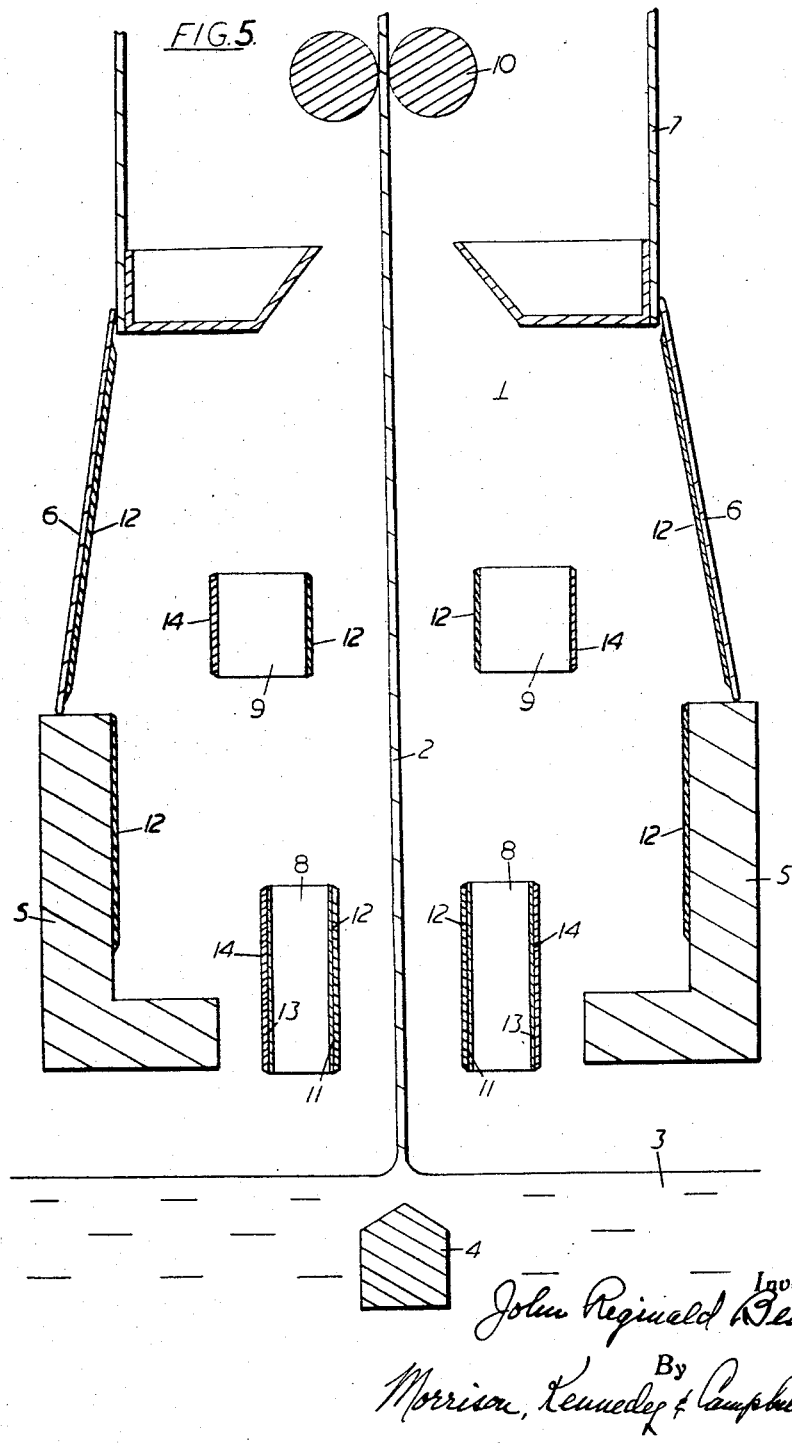

United States Patent Office 3,275,430
Patented Sept. 27, 1966

3,275,430
RADIANT TYPE COOLER IN APPARATUS FOR
PRODUCING GLASS IN RIBBON FORM
John Reginald Beattie, Maghull, near Liverpool, England, assignor to Pilkington Brothers Limited, Lancashire, England, a corporation of Great Britain
Filed Mar. 29, 1963, Ser. No. 268,875
Claims priority, application Great Britain, Mar. 30, 1962, 12,413/62
5 Claims. (Cl. 65—204)

This invention relates to methods and apparatus for producing flat glass in ribbon form from molten glass.

When a ribbon of glass is produced from molten glass by the Flat Drawn process the ribbon has to be cooled from the plastic state and normally the ribbon is passed close to a cooler which presents a heat absorbing surface to the surface of the glass ribbon in order to accelerate the cooling of the ribbon. The cooler is normally a water-cooled metal box or tube.

It is found that in the passage of the glass ribbon in front of the surface of the cooler, thickness differences may occur in the ribbon, and these thickness differences can be due to an uneven cooling occurring across the width of the glass ribbon.

Furthermore, the shorter the space in which the glass ribbon is cooled from the temperature of the molten glass to a temperature near the upper limit of the annealing range of the glass, the greater economy of space there is in the drawing apparatus.

Previously attempts have been made to accelerate the rate of cooling of a glass ribbon by applying coatings of materials to "blacken" the coolers. These prior coatings, however, have failed to stand up to the conditions in the kiln.

As already indicated, the use of uncoated coolers presenting metal heat absorbing surfaces to the glass ribbon has proved unsatisfactory, one of the difficulties being that the surfaces of the coolers oxidise to different degrees across the width of the surfaces presented to the glass ribbon, so that there is a non-uniform absorptive power across the coolers and this in turn leads to temperature differences across the width of the glass ribbon being cooled.

It is a main object of the present invention to provide a heat-absorbing surface facing a surface of a ribbon of glass produced from molten glass such that the ribbon of glass is quickly and uniformly cooled.

According to the present invention there is provided a method of producing flat glass in ribbon form from molten glass, wherein the ribbon is cooled by passage past at least one heat-absorbing surface facing a surface of the glass ribbon, characterised by modifying the heat absorbing capacity of the heat-absorbing surface facing the glass ribbon by applying to at least a part of the said heat-absorbing surface a particulate covering of a refractory material which has an absorption coefficient such that the rate of heat absorption of the said heat-absorbing surface is increased and which causes the presentation to the glass ribbon of a surface having, over at least the said part, a substantially uniform absorptive power to the radiation emitted by the glass.

From the foregoing discussion, it will be appreciated that the heat-absorbing surface which has the greatest influence on the rate of cooling of a ribbon of glass is the surface of a water-cooled metal box or tube which is provided for the purpose of cooling the ribbon. Accordingly the specific object of the present invention is to improve processes for producing glass in ribbon form from molten glass by modifying the surface of a cooler facing a surface of the glass ribbon in order to effect a quicker cooling of the glass ribbon than has been possible hitherto, and, at the same time, to provide a cooler with a surface having a greater uniformity of heat absorption than has previously been obtained.

According to the present invention, there is provided a method of producing flat glass in ribbon form from molten glass, wherein the ribbon is cooled by passage past a cooler having at least one heat absorbing surface facing a surface of the glass ribbon, characterised by modifying the heat absorbing capacity of the cooler by applying to at least a part of the surface a particulate covering of a refractory material which has an absorption coefficient such that the rate of heat absorption by the cooler is increased and which causes the presentation to the glass ribbon moving past the cooler of a surface having, over at least the said part, a substantially uniform absorptive power to the radiation emitted by the glass.

In general, the cooler is a box through which cooling water circulates and which has heat absorbing metal surfaces, one of which faces the glass ribbon to be cooled. The absorptivity of such heat absorbing metal surfaces is of the order of 80% so that the surfaces have a reflectivity of 20%.

The covering of refractory material which is applied to the surface or to part of the surface of the cooler has to be chosen of sufficient thickness to avoid partial transparency of the covering, in which case some of the radiation from the glass ribbon, which is not absorbed by the covering, would be reflected back from the metal surface of the cooler to the glass ribbon. On the other hand, if the covering is made very thick, then a substantial difference of temperature would arise between the inner and the outer surface of the covering on the surface of the cooler, on account of the comparatively low rate of conduction of heat through a thick covering of this type. Consequently the temperature difference between the surface presented by the cooler to the glass ribbon and the surface of the glass ribbon itself would be reduced, with a consequent reduction in the rate of heat lost from the glass ribbon.

Accordingly, the thickness of the covering on the surface of the cooler is chosen to embody the best opacity available, while at the same time keeping the thickness of the covering to a minimum, and the term "particulate covering" as used in this specification is to be taken as comprehending a layer or coating having a thickness consistent with these requirements. For the preferred materials of the invention, it is found that a coating of thickness of four to five thousandths of an inch is consistent with the requirements mentioned.

In general, the particulate covering will be applied to the whole of the surface of the cooler facing the glass ribbon and according to this aspect of the invention, there is provided a method of producing flat glass in ribbon form from molten glass wherein the ribbon is cooled by passage past a cooler having at least one heat absorbing surface facing a surface of the glass ribbon, characterised by modifying the heat absorbing capacity of the cooler by applying to the surface a particulate covering of a refractory material having an absorption coefficient such that the rate of heat absorption by the cooler is increased and presenting to the glass ribbon moving past the cooler a surface having substantially uniform absorptive power to the radiation emitted by the glass.

In one well known method of producing flat glass, a ribbon of glass is drawn vertically from molten glass and passes between coolers which present heat absorbing surfaces to the two surfaces of the glass ribbon near to the meniscus from which the glass ribbon is drawn. In this known method of drawing a glass ribbon, it has been found necessary to provide adjustable pads which can be manipulated in front of the coolers so that selected portions of the surfaces of the coolers are shielded from the glass ribbon. It has been found that, by appropriate manipulation of the pads in front of the coolers, any thickness differences across the width of the ribbon can be substantially reduced.

Accordingly, it is a further object of the present invention to reduce the number of pads which have to be manipulated in front of the coolers near the meniscus in order to achieve a consistent thickness across a glass ribbon which is drawn vertically, and, if possible, to eliminate the use of such pads altogether.

According to this aspect, the present invention provides a method of drawing flat glass in ribbon form vertically from the molten glass wherein the ribbon is cooled by passage between coolers presenting heat absorbing surfaces to the surfaces of the glass ribbon, characterised by modifying the heat absorbing capacity of the coolers by applying to the surfaces of the coolers facing the surfaces of the glass a particulate covering of a refractory material having an absorption coefficient such that the rate of heat absorption by the coolers is increased, and presenting to the glass ribbon moving between the coolers surfaces having substantially uniform absorptive power to the radiation emitted by the glass.

The preferred materials for use as the particulate covering according to the present invention are highly heat-absorbing refractory materials such as chromium sesquioxide ($Cr_2O_3$) and silicon carbide (SiC).

Inevitably, when a cooler is provided in a drawing chamber, the surfaces of the cooler which do not face the ribbon of glass being drawn will receive considerable quantities of heat from the structure of the drawing chamber. In consequence of this absorption of heat from all directions by the cooler, a high rate of flow of the cooling water through the cooler is necessitated, and it is a still further object of the present invention to effect a reduction in the rate of flow of the cooling water in the cooler.

A method according to the present invention is therefore also characterised by imparting to a surface of the cooler or coolers facing away from the glass ribbon a heat reflecting capacity, by applying to this surface of the cooler or coolers a coating of a refractory material having a heat reflectivity greater than its heat absorptivity, whereby an increased coefficient of reflection is obtained on this surface for radiation falling thereon.

More particularly the said surface or surfaces of the coolers facing away from the glass ribbon are coated with refractory oxide materials such as zirconia, including 5% by weight of calcium oxide, or alumina.

In addition to the cooling of the glass ribbon which is effected in a flat drawn process by the heat-absorbing surfaces of the coolers between which the ribbon is passed, heat from the glass ribbon is absorbed by the surfaces of the L-blocks and of the walls forming the chamber within which the coolers are situated. Advantageously at least a part of the surfaces of the L-blocks facing the glass ribbon have a particulate covering of the said refractory material, and also the walls forming the chamber may comprise metal baffle plates having a particulate covering of the said refractory material applied to at least a part of the surfaces of the metal baffle plates facing the glass ribbon.

The present invention also comprehends a cooler intended for use in the drawing chamber of apparatus for drawing flat glass in ribbon form, the cooler comprising a box through which cooling water may circulate having means for coupling the box to a source of supply of cooling water, and for discharging water therefrom, characterised in that the box is a metal box having over at least a part of the obverse face thereof a particulate covering of a refractory material having a greater absorption coefficient of heat than the said metal.

Preferably the cooler according to the invention is further characterised in that the reverse face of the box is coated with a coating of a refractory material having a heat reflectivity greater than its heat absorptivity to the radiation falling upon it.

In a particular embodiment of the invention, the particulate covering of refractory material having a greater absorption coefficient of heat than the metal of the box is present on the whole central portion of the obverse face of the box, and the marginal portions of the said obverse face have a particulate covering of a refractory material having a heat reflectivity greater than its heat absorptivity to the radiation falling upon it.

The present invention further comprehends apparatus for drawing glass in ribbon form vertically from molten glass, comprising a container for the molten glass, means for continuously drawing a ribbon of glass therefrom, and coolers located just above the meniscus in the molten glass, and comprising obverse metal cooling surfaces having thereon a particulate covering of a refractory material having a coefficient of heat absorption greater than the coefficient of heat absorption of the said metal.

Preferably the reverse surfaces of the coolers have a coating of a refractory material having a coefficient of heat reflectivity greater than its coefficient of heat absorptivity, whereby the reverse surfaces of the boxes have an increased coefficient of reflection for radiation falling upon them.

In order that the invention may be more clearly understood, reference will now be made to the accompanying diagrammatic drawings which illustrate by way of example a preferred embodiment of the invention, and in which:

FIGURE 1 shows in part section a drawing chamber in which a ribbon of glass is drawn vertically from the molten glass and in which the coolers near the meniscus have their heat-absorbing capacity modified according to the present invention, FIGURE 2 is a side view in part section of the drawing chamber of FIGURE 1, FIGURE 3 shows an alternative shape of cooler to that employed in the drawing chamber of FIGURES 1 and 2, FIGURE 4 shows another cooler incorporating the present invention, and FIGURE 5 shows a view, similar to that of FIGURE 1, of another embodiment of a drawing chamber according to the invention.

In the drawings, like reference numerals designate the same or similar parts.

Referring to the drawings, and more particularly to FIGURES 1 and 2, there is shown a drawing chamber 1 in which a ribbon of glass 2 is vertically drawn from a bath of molten glass 3. The ribbon 2 is drawn from the surface of the bath above a draw bar 4 submerged in known manner in the molten glass to stabilize the line of draw.

The drawing chamber 1 is comprised by L-blocks 5 and walls 6, which may be refractory walls or metal plates, above which is superimposed a conventional annealing lehr 7. The glass ribbon 2 is drawn vertically between the two pairs of coolers 8 and 9 by pairs of drawing rollers such as 10 in the annealing lehr.

The coolers 8 and 9, which are represented diagrammatically in the drawings, are conveniently boxes through which cooling water is passed, although they may equally be a series of pipes in which the cooling water circulates. The walls of the coolers themselves are made of heat absorbing metal.

According to the present invention, the surfaces of the walls 11, which are the walls of the coolers 8 facing the glass ribbon 2 as it is drawn from the molten glass 3, have applied thereon a particulate covering 12 of chromium sesquioxide. The particulate coverings 12 have a thickness of .005" and may conveniently be deposited on the surfaces of the walls 11 of the coolers 8 as an atomised spray, so that the particles of chromium sesquioxide sinter together on the surfaces of the walls 11 to form the respective particulate coverings.

A particulate covering of chromium sesquioxide having a thickness of .005" has a coefficient of heat absorptivity of the order of 90% over the whole range of wavelengths of radiations emitted by the glass ribbon 2, that is to say in the range of wavelengths from about 1 micron up to 10 microns. However, the rate of conduction of heat through a particulate covering of thickness of .005" is very high, and it is found that the surface of the particulate covering 12 is only a few degrees above the temperature of the cooling water passing through the cooler 8. The temperature of the glass ribbon 2 as it passes between the particulate coverings 12 on the coolers 8 will be of the order of 850° C. to 900° C.

In addition, the surfaces of the walls 13 of the coolers 8 which face away from the glass ribbon 2 have applied thereon particulate coverings 14 of zirconia including 5% by weight of calcium oxide. The particulate coverings 14 are conveniently applied to the walls 13 of the coolers 8 in the same manner as the particulate coverings 12 are applied to the walls 11 of the coolers 8. Also, the particulate coverings 14 will have a thickness of approximately .005".

The particulate coverings 14 of zirconia plus 5% calcium oxide have a reflectivity of more than 50% over a substantial part of the wavelength range 1 to 5 microns, and a high proportion of the radiations emitted by the surrounding parts of the drawing chamber, for example the L-blocks 5 will be in this wavelength range. Accordingly, the heat absorbed by the coolers 8 from the structure of the drawing chamber is considerably reduced, and consequently the cooling water can be pumped through the coolers 8 at a slower rate than was necessary heretofore.

Alternatively, the cooling water may be pumped through the coolers 8 at the same rate as before with a consequent increase of the cooling of the glass ribbon 4 effected by the coolers 8.

In the embodiment of the invention shown in FIGURES 1 and 2 of the accompanying drawings, particulate coverings according to the invention are applied only to the coolers 8 in the neighbourhood of the meniscus through which the glass ribbon 2 is drawn from the molten glass 3, and the other coolers 9 in the drawing chamber are conventional coolers with heat-absorbing metal surfaces. However, if desired, particulate coverings similar to the particulate coverings 12 and 14 on the coolers 8 may be applied to the surfaces of the coolers 9 facing respectively towards the glass ribbon 2 and away from the glass ribbon 2, as shown in FIGURE 5 of the accompanying drawings.

As may be seen from FIGURE 2 of the accompanying drawings, the coolers 8 present a rectangular surface to the glass ribbon being drawn therebetween. However, in order to preserve a consistent rate of cooling across the width of the glass ribbon 2, it is sometimes desirable for the coolers 8 to present a greater heat-absorptive area to the central portion of the glass ribbon 2 than to the marginal portions. Accordingly the coolers 8 may have the triangular shape shown in FIGURE 3 of the accompanying drawings.

Alternatively the coolers 8 may be maintained rectangular in shape as shown in FIGURE 2, but the particulate covering 12 can be applied to the surface of the walls 11 in a band of varying thickness to obtain a greater cooling effect in the central portion of the glass ribbon 2 than in the marginal portions.

In FIGURE 4 there is shown another cooler 8 according to the invention. The cooler 8 of FIGURE 4 has a particulate covering 15 of chromium sesquioxide on its central portion which faces the central portion of the glass ribbon being drawn past it. On the marginal portions of the cooler 8, however, there are applied particulate coverings 16 of zirconia including 5% by weight of calcium oxide. With the cooler 8 of FIGURE 4, which has particulate coverings 15 and 16 as shown, more heat is absorbed by the cooler from the central portion of the glass ribbon than from the marginal portions of the ribbon, so that the tendency in some drawing kilns of the marginal portions of the ribbon to cool more quickly than the central portion is counterbalanced and a substantially even rate of cooling is achieved across the whole width of the ribbon.

Referring now to FIGURE 5 of the accompanying drawings, there is shown a drawing chamber 1 which is comprised by L-blocks 5 and metal walls 6. Within the drawing chamber 1 there are two pairs of coolers 8 and 9, which bear, on the surfaces facing the glass ribbon 2, particulate coverings 12 of chromium sesquioxide. In addition, similar particulate coverings 12 of chromium sesquioxide are applied to the surfaces of the metal plates 6 which face the glass ribbon 2 and also to those parts of the surfaces of the L-blocks 5 facing the glass ribbon which are not screened from the glass ribbon 2 by the coolers 8.

While the invention has been described as applied to a ribbon of glass which is drawn vertically from a bath of molten glass, it is to be understood that the invention equally has application to heat-absorbing surfaces, for example of coolers, used in cooling the surface of a ribbon of glass carried horizontally, for example on the surface of a molten metal, such as tin.

It is found that the particulate coverings 12 and 14, although having different coefficients of expansion from the metal from which the walls of the coolers 8 are formed, are nevertheless of a thickness sufficiently thin not to be caused to peel off by variations of temperature.

By the use of the present invention, variations in the absorptivity across the surface of the coolers 8 due to changes in the surface finish of the metal, and a degree of oxidation of the metal, may be substantially avoided, and completely avoided when a particulate covering is applied over the whole of the surface of the coolers facing the glass ribbon.

I claim:

1. In an apparatus for producing flat glass in ribbon form in which the glass as it is produced from molten glass is advanced lengthwise as a ribbon along a cooling path, a cooler disposed opposite said path in position to cool the advancing glass ribbon comprising a metal box through which a cooling medium may be circulated having an obverse metal face turned toward said path so as to face a face of the advancing ribbon, said cooler face having on at least a substantial part thereof a sintered particulate covering of refractory material selected from the group consisting of chromium sequi-oxide ($Cr_2O_3$) and silicon carbide (SiC) and having greater heat absorptivity than that of the metal of said cooler face over a range of radiation wavelength of 1 micron up to 10 microns, said covering having a thickness of about four to five thousandths of an inch, said particulate covering being uniformly applied over said part of said cooler face, and having the property of absorbing radiation emitted by the glass ribbon in a substantially uniform manner over said part of the cooler face.

2. In an apparatus according to claim 1, said cooler having a reverse face opposite said obverse face and facing away from said path, said reverse face having on at least a substantial part thereof a particulate covering of a refractory material having a heat reflectivity greater than its heat absorptivity.

3. In an apparatus according to claim 2, the particulate covering on said reverse face being of a refractory material of a class consisting of zirconia including 5% of weight of calcium oxide and alumina.

4. In an apparatus according to claim 1, wherein the particulate covering has an absorption coefficient of heat greater than that of the metal of the box and is present on the whole central portion of the observe face of the box, the marginal portions of said obverse face having a particulate covering of a refractory material having a heat reflectivity greater than its heat absorptivity to the radiation falling upon it.

5. In an apparatus according to claim 1, said cooler having a reverse face opposite said obverse face and facing away from said path, said reverse face having on at least a substantial part thereof a particulate covering of a refractory material of a class consisting of zirconia including 5% of weight of calcium oxide and alumina.

References Cited by the Examiner

UNITED STATES PATENTS

| | | | |
|---|---|---|---|
| 1,610,443 | 12/1926 | Gregorius | 65—204 |
| 1,656,103 | 1/1928 | Drake | 65—204 |
| 1,718,372 | 6/1929 | Mambourg | 65—204 |
| 1,756,798 | 4/1930 | Reece | 65—204 |
| 1,830,788 | 11/1931 | Forman | 65—85 |
| 1,836,411 | 12/1931 | Trink et al. | 65—204 X |
| 2,284,348 | 5/1942 | Tharp | 65—204 X |
| 2,631,410 | 3/1953 | Drake | 65—205 |
| 2,864,203 | 12/1958 | Long | 65—348 |
| 3,208,842 | 9/1965 | Ward | 65—203 |
| 3,212,872 | 10/1965 | Shorr et al. | 65—203 |

FOREIGN PATENTS 898,691  6/1962  Great Britain.

OTHER REFERENCES

"General Electric Review," March 1941, volume 44, No. 3, pages 167 to 173, entitled "Production and Transmission Reflection and Measurement," by Dr. Lewis R. Koller.

DONALL H. SYLVESTER, *Primary Examiner.*

F. W. MIGA, *Assistant Examiner.*